Patented May 6, 1969

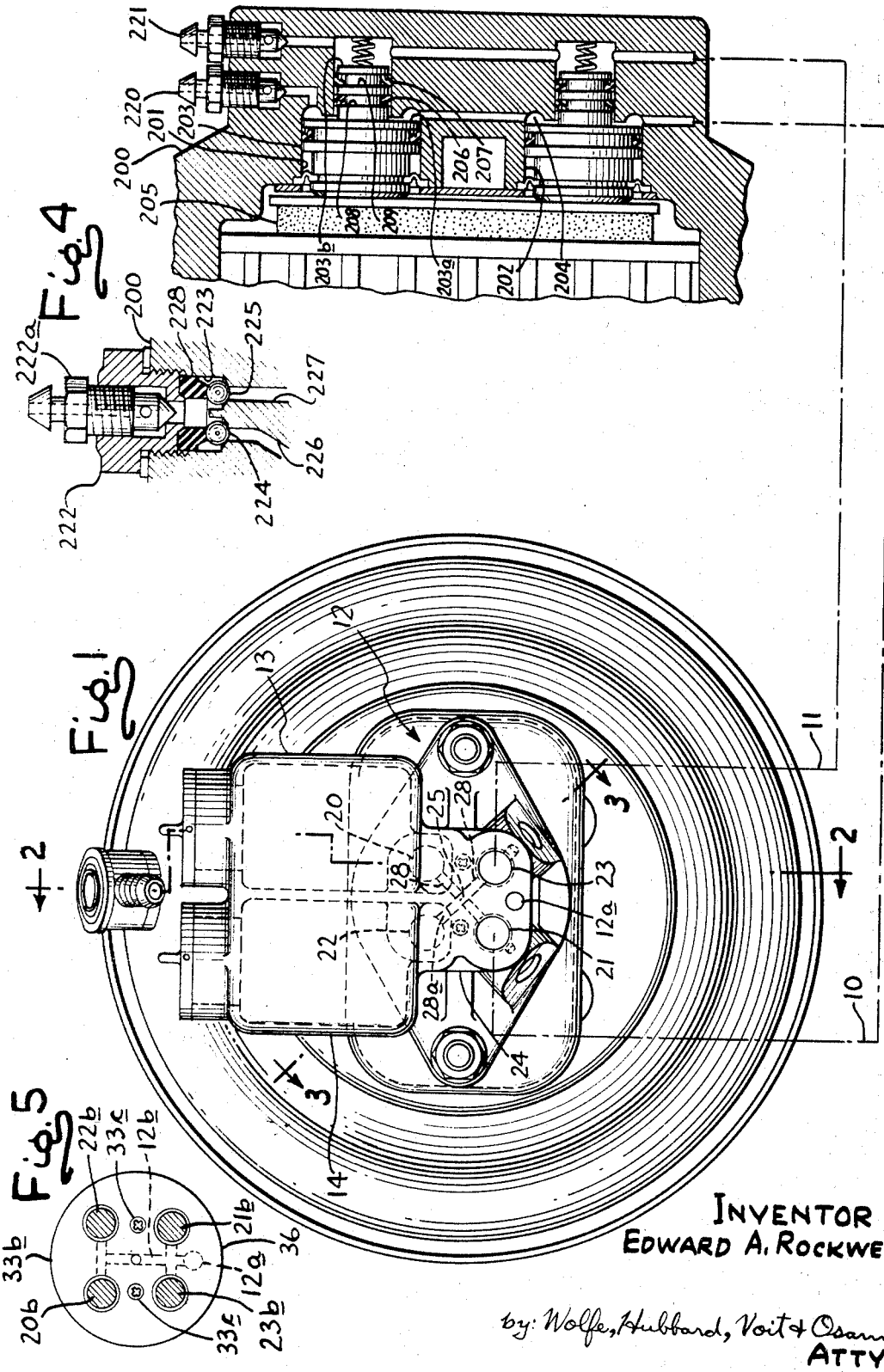

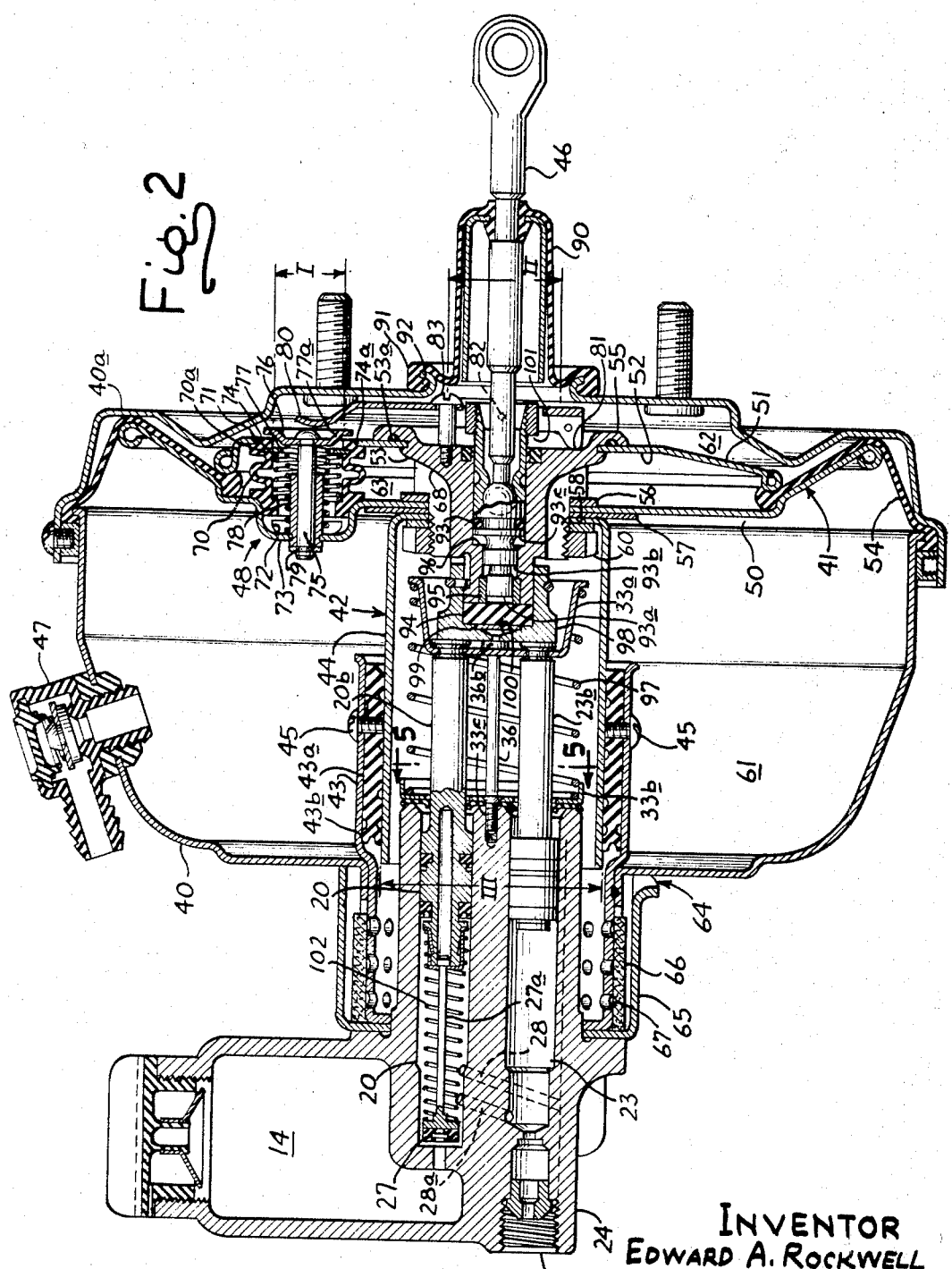

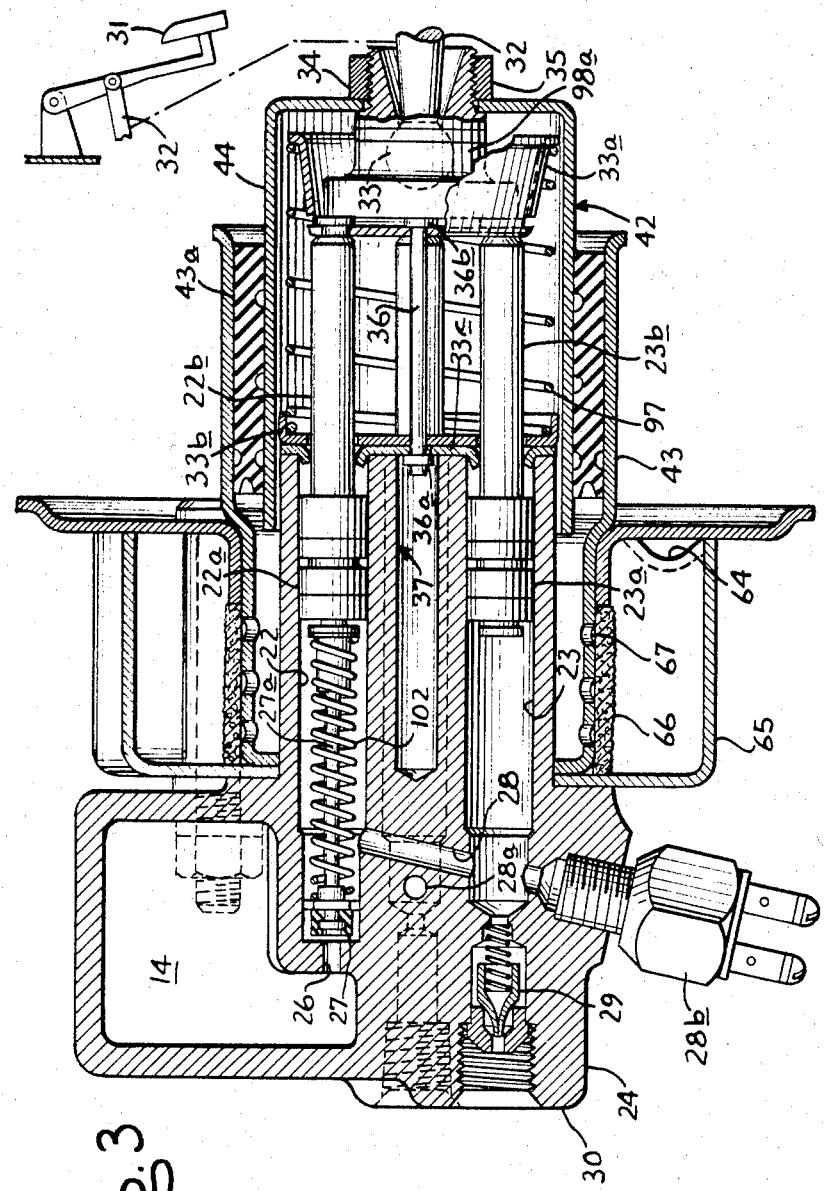

3,442,080
DUAL HYDRAULIC BRAKE SYSTEMS AND BRAKE BOOSTER MECHANISMS THEREFOR
Edward A. Rockwell, 167 Ashdale Place, Los Angeles, Calif. 90049
Filed Apr. 5, 1966, Ser. No. 540,308
Int. Cl. B60t 11/10
U.S. Cl. 60—54.5                           13 Claims

ABSTRACT OF THE DISCLOSURE

A dual hydraulic brake system having two pairs of master cylinders with the two cylinders of each pair symmetrically disposed on opposite sides of a longitudinal axis, and a pair of independent fluid reservoirs operatively connected to the two pairs of master cylinders through independent hydraulic lines so that the two pairs of master cylinders are hydraulically isolated from each other. The two cylinders of each pair are hydraulically interconnected, and the outputs of the two pairs of cylinders are connected to dual fluid pressure transmitting lines to actuate the brakes. Upon a drop in pressure in one of the pairs of master cylinders due to a drop pressure in one side of the dual system, hydraulic and mechanical balance is maintained in the other pair. The system also includes a movable pedal for actuating the master cylinders, a power booster unit, and a reaction mechanism for providing a mechanical reaction for supposing increments of movement of the brake actuating means. The valve for the power unit is mounted on the power wall and offset from the actuating means, and is operated by a lever having a pivot element located on the power wall on the opposite actuating means from the valve so that axial movement of the actuating means tilts the lever to operate the valve.

---

The present invention relates generally to improvements in hydraulic brake systems and brake booster mechanism for such systems.

It is a primary object of this invention to provide an improved dual hydraulic brake system which includes a compact mechanism for producing hydraulic pressure in the separate brake actuating sections of the system independently, and which maintains hydraulic and mechanical balance in either one of the sections upon a drop in pressure in the other section. A related object is to provide such a brake system having a wheel brake actuator in which the unit loading of the associated friction brake lining remains the same even in the event of failure in one of the sections of the system. Thus, it is a main object of the invention to provide such a dual hydraulic brake system which maintains perfect balance in the system even in the event of a failure in one of the separate brake actuating sections. A related object of one particular aspect of the invention is to provide such an improved dual hydraulic brake system which includes a brake booster mechanism.

A further object is to provide a wheel brake actuator especially adapted for use in such a system for actuation of caliper type disc brakes. Another object is to provide an optional single air bleeder arrangement for a brake system having dual sections.

It is another object of the present invention to provide an improved hydraulic brake system including a brake booster mechanism which responds very rapidly to the manual brake actuator. In this connection, it is still another object of the invention to provide such a booster mechanism which transmits a portion of the reaction force from independent sections of a dual hydraulic system to the actuating means for the booster mechanism, such as to a brake pedal. A related object is to provide such a mechanism which is effective even in the event of a failure in one section of the system to provide the same characteristic reaction response provided by the system when both sections are operative.

A further object of the present invention is to provide an improved brake booster mechanism which automatically compensates for variations in the pressure differential across the power wall so that the manual force required to merely actuate the power wall remains substantially constant irrespective of the varying input-output reaction forces.

It is a still further object of the present invention to provide an improved brake booster mechanism which facilitates assembly of a reaction mechanism around a centrally located actuating plunger. In this connection, a more particular object is to provide such a mechanism in which the main actuating plunger is centrally located for optimum balance, and the control valve for the booster mechanism is offset from the plunger to facilitate assembly of a reaction mechanism around the plunger, and to simplify the porting construction.

Yet another object of the invention is to provide an improved brake booster mechanism of the foregoing type in which the entire power wall assembly can be quickly assembled and fastened by a single locking means.

Other objects and advantages of the present invention becomes apparent from the following detailed description taken in connection with the accompanying drawings, wherein:

FIGURE 1 is an end view of the brake booster mechanism of FIG. 2 and an associated caliper type wheel brake actuator showing one side thereof;

FIG. 2 is a longitudinal cross-sectional view taken along line 2—2 in FIG. 1;

FIG. 3 is a longitudinal cross-sectional view through a manual actuating mechanism for a dual hydraulic brake system embodying the present invention and related to master cylinder of FIGURE 1 taken on line 3—3 thereof;

FIG. 4 is a bleeder arrangement alternative to the dual bleeders of FIGURE 1; and FIG. 5 is a view taken on lines 5—5 of FIG. 2 through a transverse section of the plungers.

While the invention will be described in connection with certain illustrated embodiments, it will be understood that it is not intended to limit the invention to these particular embodiments but, on the contrary, it is intended to cover such alternative embodiments, constructions and equivalents as may be included within the spirit and scope of the appended claims.

Turning now to the drawings and referring particularly to FIGS. 1 and 3, the invention will be described first in connection with a dual hydraulic brake system having master cylinders which are operable manually without power assist. The dual hydraulic lines 10, 11 connected to the manual actuating mechanism illustrated in FIGURE 3 may be of the type described in my co-pending application Ser. No. 437,639, filed Mar. 8, 1965, and entitled, "Disc Brake With Compensation, Anti-Skid Control, and Fail-Safe System." The dual hydraulic lines 10, 11 are connected via a master cylinder assembly 12 to a pair of independent fluid reservoir tanks 13, 14 mounted above the master cylinders, and the fluid in each line is supplied to a cooperating slave cylinder at each of the vehicle wheels to operate the wheel brakes. It will be appreciated that both of the hydraulic systems are fully operative at all times, thereby enabling for the same unit an overall reduction of the fluid pressure according to the cylinder sizes in both hydraulic systems. The two hydraulic systems associated with the dual reservoirs 13, 14 are completely independent of each other and, although the two systems are both operative together in parallel during normal usage, the vehicle brakes may be operated by only one of the hydraulic systems in the event of a failure in the other system, in which case the unit pressure in the remaining system will double (if the cylinders for both systems are the same size), but will maintain the same hydraulic ratio. A dual hydraulic system of this type is described in more detail in the aforementioned co-pending application Ser. No. 437,639, and reference is made thereto so that the details need not be repeated herein, except in the present instance I have shown a caliper type brake and alternate air bleeders.

In accordance with one aspect of the present invention, the master cylinder assembly 12 comprises two pairs of master cylinders with the two cylinders of each pair mounted symmetrically on opposite sides of a central longitudinal axis. The actuating means for the two pairs of cylinders extends along the common longitudinal axis, and passage means 28 and 28a are provided to hydraulically interconnect the two master cylinders of each pair so that upon a drop in pressure in one of the pairs of master cylinders hydraulic and mechanical balance is maintained in the other pair. Thus, two pairs of master cylinders 20, 21 and 22, 23 are formed in a casting 24 so that the two master cylinders of each pair are symmetrically disposed on opposite sides of a central longitudinal axis 25. The first pair of master cylinders 20, 21 receive hydraulic fluid from reservoir 13 and control the pressure within the hydraulic line 10, while the second pair of master cylinders 22, 23 are associated with the other reservoir 14 so as to control the fluid pressure within the second hydraulic line 11.

Turning to the second pair of master cylinders 22, 23 (FIGS. 1 and 3) for a more detailed description of the master cylinder construction, the top cylinder 22 receives hydraulic fluid from the reservoir 14 through a port 26 which is positioned to cooperate with a compensating check valve 27 having a rubber grommet fastened to a stem 27a. Thus, the two top master cylinders 22, 20 have center compensating valves including special pistons 22a, 20a and piston rods 22b, 20b projecting rearwardly from the open end of the cylinders and having a lost motion connection with the pistons 20 and 22. In order to hydraulically interconnect the two master cylinders 22, 23 a passage 28 is bored through the middle section of the casting 24 so as to communicate with both master cylinders 22 and 23. Thus, as the pistons 22a, 23a are advanced within the master cylinders, hydraulic fluid received from the reservoir 14 is displaced from both master cylinders through a residual pressure check valve 29 in a discharge fitting boss 30 provided for the conventional fitting to the brake line 11.

It will be understood that the companion pair of master cylinders 20, 21 are similarly constructed and connected by passages 28a to displace hydraulic fluid from the reservoir 13 to the other brake line 10. It is important to note that the interconnected master cylinders of each pair, such as the cylinders 22, 23 for example, are disposed symmetrically on opposite sides of the longitudinal axis 25, which is the axis followed by the main actuating plunger to be described in more detail below. Consequently, if the hydraulic pressure drops in one pair of master cylinders, due to a failure in one of the hydraulic lines for example, the remaining pair of master cylinders is maintained in perfect hydraulic and mechanical balance because it operates independently of the other pair of master cylinders and is constructed symmetrically around the axis of the common actuator for all of the master cylinders. As a result, there are no undesirable off center or bending forces applied to the master cylinder assembly even in the event of a hydraulic failure in one of the dual brake lines except for the minimum effect of the very light spring 102, and even this slight unbalance can be balanced out by use of a similar spring (not shown) in the second piston. In each terminal boss of the passages 28 and 28a there is provision for a stop-light switch shown at 28b for use in connection with a system similar to that disclosed in my said co-pending application Ser. No. 237,635.

As shown in FIGURE 3, the master cylinders 22 and 23 are connected similarly to cylinders 20 and 21 for actuation by a pedal 31 via an actuating rod 32 which is coupled to the ends of the piston rods by means of a ball socket member 33 so that all four master cylinders receive substantially equal actuating force therefrom. The casting 24 which forms the quartet of master cylinders projects forwardly from a mounting cup 54 which, in this case, is adapted to be secured on the front of the firewall. The master cylinder pistons project into the mounting cup 43 for operation by the members 33 and 33a connected to the pedal, with the longitudinal movement of the actuating members 32 and 33 being guided by a bushing 43a in the cup 43. A limiting rod 36 projects forwardly for sliding movement in a complementally formed recess 37 in the master cylinder casting 24 on the center axis providing lost motion between a snap-ring 36a and the rod head 36b. A light return spring 97, just sufficient to assure return of the four pistons, is seated between the casting 24 and the coupling member 33 by way of retainer cups 33a and 33b and thus serves to return the actuating mechanisms, including the brake pedal, to the "off" or retracted position which is obtained with the master cylinder pistons fully retracted. In this connection, the off-position limiting rod 36 accurately determines the off position of the compensating valve 27.

The retainer cup 33b also retains a rubber seal member 33c, which seals off any leakage of fluid. In case of leakage of one or more plungers, the same can find access to the outside of casting 24 by the hole 12a (FIG. 1) which is drilled through to recess 12b (FIG. 5).

A dual brake system which includes the balanced master cylinder assembly described above and also a brake booster unit for power assist is illustrated in FIGURES 1, 2, 4 and 5. Thus, the power booster unit is formed with a casing 40 having a movable power wall 41 operating axially movable actuating means herein shown as including a tubular output member assembly 42 mounted in a guide sleeve 43 fixed to the front end of the casing along the center axis of the unit. The outermost member 44 of the output assembly 42 projects forwardly in sliding engagement with the inner surface of a bearing sleeve 43a, suitably made of low friction plastic having a separate, or as shown integral, air vacuum seal 43b. Since the seal 43b is secured to the sleeve 43 by means of a pair of screws 45, the sleeve 43 supports and guides the power wall assembly independently of the pistons 20 through 23 so as to avoid binding them. The actuating means is connected to the quartet of master cylinders 20 through 23 which apply pressure to fluid in the hydraulic lines 10, 11 leading to the cylinders at the wheels for actuating the wheel brakes. The unit is actuated from a brake pedal or the like through a linkage including a rod 46 which extends into the casing from the right side as viewed in FIGURE 2 and is included in the actuating means.

Within the casing 40, 40a the movable power wall 41 operable by differential pressure applied on opposite sides of the wall produces the power assist for operating the master cylinders. As herein shown, the casing 40 is connected to a source of vacuum such as the intake manifold of a vehicle engine via a conventional check valve 47. In the illustrative embodiment, the movable wall 41 is vacuum suspended, that is, in the retracted position of the wall 41 as shown in FIGURE 2 the casing 40 is evacuated on both sides of the wall. By valve means 48 actuated by the control rod 46, air is admitted into the casing 40a behind the power wall 41 to provide the differential pressure for producing the output force operating the master cylinders. The valve means 48 is of the self-lapping type characterized by successive movements of the wall 41 and the valve means 48, which in the present case is carried by the wall 41, caused by successive movements of the control rod 46. This valve means is similar to valve mean in my Patent No. 2,794,320, except that the external spring and retainers shown in the patent are replaced by the stiffening device 70a and internal spring 71 for more compactness and uniformity in determining the effective areas of the valve.

The power wall assembly 41 includes a pair of dished annular plate members 50, 51 designed to form an intermediate air chamber 52 therebetween. To support the plate members 50, 51 the inner ends thereof are secured to a common annular supporting member 53, while the outer ends of the plate members are secured to the inner periphery of a flexible annular diaphragm 54. The beaded outer periphery of the diaphragm 54 is firmly anchored between the two sections of the main casing 40 and 40a so as to permit movement of the entire power wall assembly relative to the casing while maintaining a fluid seal between the wall and the casing.

In accordance with one aspect of this invention, the entire power wall assembly, including the associated valve mechanism, is mounted around the outside of the annular supporting members 53 so that the longitudinal actuating means and associated reaction mechanism can be conveniently assembled within the annular supporting member. Moreover, in keeping with the present invention, the power wall assembly is designed so that it can be quickly fastened to the outer surface of the annular supporting member by tightening a single locking means. Thus, the supporting member 53 receives the control rod 46 and associated reaction mechanism on the inside, while the outside supports the power wall plates 50, 51 as well as the tubular guide member 42 of the output assembly. The rear power wall plate 51 is received in a peripheral slot in the rear portion of the member 53 having a seal ring 53a and backed up by a flange 55, while the forward plate 60 is positioned between a stiff washer 56 and a gasket 57 on a forward portion of the supporting member 53, the latter also serving as a bumper for the flared end of sleeve 43. To complete the assembly, an inturned flange 58 on the rear end of the tubular member 42 is positioned against the washer 57, a final stiff washer 59 is fitted against the flange 58, and then a locking nut 60 is threaded otno the supporting member 53 so as to lock the entire power wall assembly to the outer periphery of the supporting member 20 for axial movement back and forth within the casing 40 and 40a. Thus, it can be seen that the various elements of the power wall assembly can be conveniently placed in position around the supporting member 53, and then quickly locked in place simply by tightening the single nut 60.

It will be recognized that the power wall 41 divides the interior of the casing 40 into two separate chambers, namely a forward "vacuum" chamber 61 and a rear "power" chamber 62, and movement of the power wall is controlled by modulating the differential pressure between these two chambers. In the particular embodiment illustrated, the differential pressure is controlled by modulating the pressure within the power chamber 62 by means of the valve mechanism 48 which admits regulated amounts of air from an intermediate or delivery chamber 63 into the rear chamber 62. This pressure-modulating air is drawn into the brake mechanism through an opening 64 formed between the front wall of the casing 40 and a mounting cup 65 secured thereto. The incoming air passes through a filter or air cleaner 66, which excludes foreign matter from the interior of the brake mechanism, and then on through a plurality of ports 67 formed in forward portion of the guide sleeve 43. From the ports 67, the air flows axially through the guide sleeve 43 and the co-operating conduit member 44 which is included in the output assembly 42, and finally through a plurality of arcuate passageways 68 formed in the annular supporting member 53 for the purpose of providing fluid communication between the interior of the conduit member 44 and the delivery chamber 63 formed between the two plates of the power wall. Thus, it will be appreciated that the intermediate delivery chamber 63 is at substantially atmospheric pressure at all times and the interconnecting passageways leading therefrom to the intake opening 64 are never closed, and the seal 43b seals off atmosphere from the chamber 61 at all times.

Movement of the power wall 41 is, as has been stated, produced by admitting air into the power chamber 62 via the valve 48. In as much as a vacuum exists at all times in the forward chamber 61, the force tending to move the power wall 41 to the left in FIGURE 2 depends on the pressure in the chamber 62. This pressure is modulated by operation of the control valve 48 which is shown in FIGURE 2 in its normal "off" or inoperative position. The valve assembly 48 includes a grommet valve 70 which consists of a tubular bellows-like member, made of rubber or similar flexible material, normally disposed with its ends abutted against the interior surfaces of the opposed plate 50, 51. The walls of the valve member 70 are corrugated as in a bellows so as to permit longitudinal contraction and elongation of the valve member 70, resulting in seating and unseating certain valve portions as described in more detail below.

Normally, when the brake is not actuated by the vehicle operator, the valve 48 is open between the two chambers 61, 62 so that those chambers are both under vacuum, and also isolates the two chambers 61, 62 from the intermediate air delivery chamber 63. In this stage, the grommet valve 70 is held in its most elongated condition by means of a compression spring 71 (having a force only slightly more than necessary to expand the valve 70) seated within the valve against a pair of shallow terminal shoulders formed in the inner surface of the valve 70 with the valve end having a stiffening annular plate 70a. Thus, the valve 70 is normally held with its ends in tight sealing engagement with the inner surfaces of the plate 50, 51 which define the delivery chamber 63, and the spring 71 also supports the interior of the grommet to prevent it from collapsing, thereby preventing the passage of air out of the chamber 63 so as to isolate the same from the two chambers 60, 61.

In order to intercommunicate the two chambers 61, 62 the left end of the valve member 70 opens into the chamber 61 through a plurality of perforations 72 formed in a cup-shaped section 73 of the forward power wall plate 50, while the right end of the valve member 70 cooperates with an orifice 74 formed in the rear power wall plate 51. Thus, it can be seen that the two fluid chambers 61, 62 are in communication with each other through the interconnecting passageway formed by the perforations 72, the interior of the valve member 70, and the orifice 74.

For the purpose of isolating the two chambers 61, 62 from each other and at the same time admitting air from the delivery chamber 63 into the power chamber 62, a movable valve seat assembly is provided for closing the right end of the grommet valve 70 and at the same time contracting the grommet valve 70 so as to unseat it from the rear power wall 51, thereby admitting air from the delivery chamber 63 into the power chamber 62. Thus, axially mounted within the cup-shaped section 63 and spaced from the interior wall of the valve 70 is a movable valve seat assembly comprising a slidable plunger 75 having an inverted, hat-shaped valve seat 76 secured to the right hand end thereof. A compression spring 77 of predetermined force normally urges the plunger 75 and the valve seat 76 to the right so that the right end of the valve 70 opens a predetermined amount into the power chamber 62 through the orifice 74. The plunger 75 is slidably carried in a bushing 78 which is spun into the left hand power wall plate 50, and is limited in its movement by a snap ring 79 carried by the left hand end thereof which thus determines the off position of the valve.

When the plunger 75 is moved to the left with respect to the power wall 41 (as by control means hereinafter described, the movable seat 76 is brough to rest against the end of the grommet valve 70, thus blocking any further communication between the chambers 61, 62. At this point, both chambers 61, 62 are isolated from the delivery chamber 63, and the valve is said to be in "lapped" position. Continued leftward movement of the valve seat 76 contracts the flexible valve 70, thus lifting its right hand flange from contact with the plate 51 and permitting air within the intermediate chamber 63 to flow through the annular orifice 74 into the power chamber 62. The orifice 74 is preferably tapered as shown at 74a similar to the taper at 77a on the valve seat 76. This produces a differential pressure between the chamber 61, 62 tending to move the power wall 41 to the left. Such leftward movement of the power wall is self-terminating because the entire valve assembly 48 moves away from the control means, permitting the valve 70 to elongate again and reseat the right hand flange thereof against the plate 51, thereby terminating the flow of air into the power chamber 62.

In accordance with one important aspect of the present invention, the main axially movable actuating means extends along a central longitudinal axis through the casing and the power wall, the valve mechanism for controlling the pressure differential across the wall is mounted on the power wall at a position offset from the actuating means, and the operation of the valve is controlled by a lever having one end pivoted on the power wall on the opposite side of the actuating means from the offset valve so that axial movement of the actuating means tilts the lever to operate the valve. This construction avoids any off-center loading of the unit, and achieves extremely rapid response of the control valve due to the motion-amplifying effect of the valve operating lever. Moreover, the offset location of the valve clears the center of the unit for convenient assembly of the reaction mechanism around the central actuating means, and facilitates porting for the pressures. Thus, in the particular embodiment illustrated, the control valve 46, which forms a part of the central axially movable actuating means to be described in more detail below, extends along a central longitudinal axis through the casing and the power wall, and the valve mechanism 48 is mounted on the power wall at a position offset from the axis of the control rod 46 about midway between the central axis and the outside wall of the casing thereby providing looseness of the diaphragm when power fails.

In order to operate the valve 48 in response to incremental advancing movements of the control rod 46, a valve operating lever 80 is mounted within the power chamber 62 with its lower end pivoted on the power wall at a point 81 located on the opposite side of the control rod 46 from the valve 48. The lever 80 extends upwardly from the pivot point 81 with the lever being split to fit over the control rod 46 and being connected thereto by means of a pair of connecting or actuating pins 82. Consequently, any incremental advancing movement of the control rod 46 causes the pins 82 to tilt the upper portion of the lever 81 forward about its pivot point 81 so that the upper end of the lever engages the valve seat 76 and urges it forwardly, against the bias of the compression spring 77, into engagement with the grommet valve 70. As described above, this point represents the "lapped" position of the valve. Further advancing movement of the control rod 46 then tilts the lever 80 still further so as to advance the valve seat 76 to contract the grommet valve 70 and unseat the right flange thereof from the power wall plate 51. This represents the power position in which air is admitted from the delivery chamber 63 into the power chamber 62. As the power wall 41 advances due to the pressure differential caused by the air admitted into the power chamber 62, the entire valve assembly 48 moves forward relative to the control rod 46 so that the valve elements are permitted to return to the lapped position due to the biasing action of the springs 71, 77. Further advancing movement of the control rod 46 will then again tilt the lever 81 forward against the valve seat 76 and once again move the valve mechanism to the power position in which air is admitted into the power chamber 62. This cyclic operation of the self-lapping valve 48 continues as long as the advance of the control rod 46 is continued by the vehicle operator. In order to retain the valve-operating lever 80 with the power wall and to maintain the off position of the plunger 93, the lever is anchored to the supporting member 53 by means of a stud 83 which also indexes the lever in relation to valve 48. It should be understood that although the lever 80 is carried forward with the power wall, the valve mechanism is still permitted to return to the lapped position because the lever advances relative to the control rod 46 and thus moves ahead of the lever-actuating pins 82.

It will be appreciated that the force exerted by the control rod 46 must be sufficient to overcome the compressive force of the valve spring 77 to reach the lapped position, and thereafter must overcome the effective forces of the two springs 77 and 71 in order to open the valve to the power position to admit air into the power chamber 62. Initially, there is no effective pressure differential acting on either of the springs 71 or 77 due to the same vacuum acting on both sides of the valve seat 76. However, as air is admitted into the power chamber 62 the modulated pressure therein gradually increases while a vacuum is still maintained within the valve assembly on the inside of the valve seat 76. Consequently, the pressure differential which moves the power wall acts on the effective diameter I of the valve member 76 and thus also assists the control rod 46 and the lever 80 in overcoming the resistive forces of the spring 71 and 77. Hence, in the absence of a compensating device, it would gradually become easier and easier to operate the control valve 48.

In accordance with a further aspect of this invention, a compensating means is operatively connected to the brake actuating means for responding to the modulated pressure in the power chamber for varying the force required to advance the actuating means as a function of the modulated pressure so as to compensate for the effect of the modulated pressure on the force required to operate the valve mechanism. Thus, a boot 90 is fitted over a portion of the control rod 46 behind the rear wall of the casing 40. The outer periphery of the boot 90 is beaded as at 91 for connection to a complementally formed flange 92 formed on the edge of the casing opening surrounding the control rod 46. It can be seen that the inside surface of the boot 90 is exposed to the modulated pressure within the power chamber 62, while the outside surface of the boot 90 is exposed to the atmosphere thereby providing a pressure differential across the boot corresponding to the ratio of the outside atmospheric pressure to the modulated pressure within the power chamber 62. It can also be seen that in order to advance the control rod 46, it is necessary to gradually fold the boot inwardly past the casing flange 92, and the resistive force thus offered by the boot 90 depends on the pressure differential across the boot and its effective diameter II. Of course, this pressure differential is a maximum, in a vacuum suspended unit like that shown, with the power wall at the right hand end of the casing when vacuum prevails in the power chamber, and decreases as the modulated pressure increases within the power chamber. The differential pressure on the boot thus varies inversely with the pressure differential across the valve seat 76, which also depends on the modulated pressure in the power chamber. In other words, as the modulated pressure gradually increases and thus makes it easier to operate the valve 48, it also decreases the assistance given to the control rod 46 by the flexible boot 90. Accordingly, the boot 90 is sized so as to effectively compensate for the effect of the modulated pressure on the force required to operate the valve mechanism.

In keeping with the present invention, the valve operating lever 80 is a first class lever having a ratio determined by its over all length and the length of the arm between the actuating pins 82 and the lever pivot point 81. For example, the ratio between these two lengths may suitably be on the order of about 4 to 1. This ratio in effect multiples the effective force of the valve springs 71 and 77 and requires a relatively larger force in the absence of compensation, to operate the valve 48 via the control lever 80. However, since the lever is pivoted at its lower end and thus operates as a first class lever, any actuating motion is amplified in transmission to the valve mechanism 48 so that the response of the valve mechanism 48 follows very quickly the application of the manual force. Because the valve is compensated by the boot 90, at the start of operation of the unit with vacuum prevailing in the power chamber, this vacuum acts on the effective diameter II of the boot (with air outside the boot) tending to suck the control rod 46 into the unit and thus assisting its motion. This compensation force acts in opposition to the valve springs 71 and 77 which are selected to provide a slightly greater force so that there remains a small force differential to be overcome at the beginning condition, to operate the valves and thus produce power from the unit. Since any change in modulated pressure in the power chamber as it affects the operation of the valve mechanism is balanced out due to the boot, the force differential which must be overcome to operate the valve mechanism remains the same throughout the entire range of operation of the power unit as the pressure in the power chamber increases from vacuum to atmospheric at run-out.

In order to maintain a substantially constant ratio between the force which must be applied to the control rod 46 to operate the valve mechanism, and the force required to operate the valve 48, the effective areas of the valve 48 and the boot 90 which are exposed to the modulated pressure must have substantially the same ratio to each other as the ratio of the two lever arms from the pivot point 81. For example, if the lever arms have a ratio of about 4 to 1, then the effective area of the boot 90 which is exposed to the modulated pressure must be substantially four times as great as the effective area of the valve member 76 which is exposed to the same modulated pressure. It will also be apparent that the effect of the effective area of the boot 90 is also related to the area III defined by support sleeve 42, and preferably is not substantially more than said area III so the spring 97 will be just sufficient to return both master cylinder plungers and the movable wall. Thus, if the boot effective area is made larger, this ratio of the lever arms can be made greater to satisfy the desired compensation characteristic.

In order to provide a realistic "feel" to the foot pedal or other actuating device for the booster unit, the reaction mechanism included in the illustrative structure is effective to transmit a gradually increasing proportion of the total reaction force from the output assembly 42 to the actuating rod 46 for the unit, this actuating rod being adapted to be connected to the foot pedal or some other operating element. More particularly, the reaction mechanism is such that the power booster unit provides an initially high boost ratio which gradually decreases in the reaction changeover region to a lower boost ratio which is maintained over the remaining range of operation of the power booster unit to run-out of the vacuum. In the event of failure of the vacuum, and after power run-out, a direct connection between the actuating rod 46 and the master cylinder plungers afford means for direct or manual actuation of the master without power boost by way of the shoulder 101 and rubber bumper 101a, which substantially stops any further relative motion of the control rod 46 and the power wall.

Turning to FIGURE 2 for details of the reaction mechanism, the control rod 46 extends along the longitudinal center axis of the power unit and is fixed at its forward end to a reaction plunger 93 having a stepped forward portion so as to form three peripheral shoulders providing three leading faces 93a, 93b and 93c. The first face 93a is positioned to engage a resilient bumper 94 upon advancing movement of the control rod 46, the second face 93b is designed to engage a metal annulus 95 upon further advancing movement of the rod 46, and the face 93c is positioned to engage an inside shoulder 96 on the annular supporting member 53 upon still further advancing movement. As will be apparent from the ensuing discussion, the two faces 93a and 93b and the annulus 95 function as primary and secondary reaction members.

Initial increments of movement of the valve actuating rod 93, starting from the position where the power wall is fully retracted in the casing, are opposed by a light return spring 97 plus resistance of the wall 41 so as to close the vacuum valve 76 and open the air valve 71. The resilient bumper 94 is initially effective against the forward end face 93a of the control 46 and subsequently against the annulus 95 and the supporting member 53, each of which transmits a portion of the reaction force to the plunger 93. This provides an initially light reaction force opposing pedal action and a high boost ratio determined by the rate of the return spring 97, and relatively low reaction from the resilient bumper 94. As the powerwall advances upon successive increments of forward movement of the actuating rod 46, the reaction mechanism transmits a progressively greater portion of the total reaction force from the master cylinder plungers to the actuating rod 46 and thence to the foot pedal, the remaining portion being applied to the power wall 41. Thus, upon successive increments of movement of the power wall and increase in reaction force, the end face 93a of the reaction plunger engages the resilient bumper 94 such that a portion of the total reaction force is transmitted through the resilient bumper to the actuating rod 46 according to the area of the face of the reaction plunger. The resilient, deformable bumper 94 being confined acts like a body of liquid under pressure to distribute the force between the plunger 93 and the annular surfaces of the annulus 95 and the member 96 also engaging the bumper. In other words, the bumper 94 is fitted within an enclosed space in the cup-shaped output member 98, and is placed under a gradually increasing compressive force by the reaction forces from the cylinder plungers against the member 98. With the resilient bumper being gradually compressed as the power wall advances, the reaction plunger 93 encounters increased resistance to forward movement and gives the effect to the actuating rod 46 of a gradually greater reaction force, the result being to transmit a gradually increasing proportion of the total reaction force to the actuating rod and thus to the pedal.

In addition to the resilient bumper 94, a metal spring washer 99, preferably an annular washer, coacts with the control plunger 46 and opposes pedal action. Thus, as the resilient bumper 94 is gradually compressed, the spring washer 99 is gradually deflected into a cupped recess 100 formed in the output member 98 until the spring washer 99 finally bottoms out in the forward end of the recess and permits the shoulders 93b to contact the annular area and thus shift the reaction by adding the area of 93b. At this point, there is in effect a rigid connection between the resilient bumper 94 and the output member 98 so that an even greater proportion of the total reaction force is transmitted to the actuating rod and then on to the pedal. The ratio of deflection of the spring washer 99 is predetermined by cutouts or the like so as to produce, in combination with the resilient bumper 94, the valve springs and compensation forces, an initially high boost ratio and a gradually decreasing ratio to the fixed initial ratio while approaching power run-out. Thus, the combined assembly is effective to meet different specified requirements without altering other parts. It will be understood that the faces 93a, 93b and 93c have progressing clearances so that the contacting surfaces will engage progressively.

Also, since the inventive control mechanism uses an amplified valve actuator, small differences in the distortion of the bumper 94 are more effective and thus the spring washer 99 associated with the bumper is effective to determine the changeover point with less loss of stroke on the rod 46.

For the purpose of providing direct manual actuation of the master cylinders, as for example after power run-out or in the event of power failure, the reaction plunger 93 is provided with an outwardly extending flange 101 on the rear end thereof for engaging the rear edge of the annular resilient supporting member 53a which will come into play first before contact of 93c with shoulder 96 after the control rod 46 has been advanced a predetermined distance relative to the power wall 41. In this stage of operation, i.e., with the flange 101 abutting the member 53a, the resilient bumper 94 serves effectively as a rigid element for transmitting reaction force to the actuating rod 46, which is an improvement over the mechanism described and claimed in my United States Patent 3,222,869, issued Dec. 14, 1965. Conversely, the actuating rod 46 feels stiff, there being a direct, virtually rigid connection from the rod to the output member 98 for directed manual actuation of the master cylinders.

In order to permit fine adjustments to be made in the lap gap, i.e., the gap between the reaction plunger and the resilient bumper when the control valve is in its lap position, the flange 101 is threaded onto the main body portion of the plunger 93 by a fine thread 101a. This fine adjustment feature is especially important in a device which includes the amplifying lever mechanism for actuating the valve.

Whenever the actuating force is removed from the control rod 46, both the central actuating means and the power wall assembly are returned to their normally retracted position by means of the return spring 97 acting between the output member 98 and the master cylinder casting 24, and also by a pair of light return springs 102 associated with the upper master cylinders of the two hydraulically connected pairs of master cylinders. While this particular combination of return springs is preferred in the particular structure illustrated, it will be appreciated that the desired return action could be achieved by a combination of four light return springs similar to the springs 102, i.e., one spring in each of the four master cylinders, provided the dimensions of the master cylinders are such as to accommodate springs of the required strength.

As the power wall is returned to its retracted position, the biasing spring 77 unseats the valve member 76 from the end of the grommet valve member 70 so as to re-establish intercommunication between the two chambers 61 and 62. As a result, the air which was admitted into the power chamber 62 during operation of the brake is exhausted into the forward chamber 61 and then on out through the valve 47 to the intake manifold or other vacuum source. If the chamber 61 is made several times the volume of the chamber 62, and these other forces are properly balanced, a substantial number of successive operations of the power unit are possible without exhausting the vacuum power in the reservoir provided by the chamber 61.

In assembling the power booster unit provided by this invention, the entire power wall assembly including the plates 50, 51, the valve assembly 48, the diaphragm 54, and the conduit member 44 are all preassembled and may be tested as a separate unit. Such tests may be made for example by introducing air under pressure into the conduit member 44 and submerging the entire assembly in water whereby any leaks will be indicated by bubbles. Then the forward section of the casing 40 including the master cylinders and associated elements carried thereby are connected to the rear casing section to complete a compact brake actuating unit ready for connection to the dual hydraulic lines. The unit of this invention being the same overall size as a comparable displacement of a conventional single cylinder unit, it can be readily replaced in the field where a change to a dual unit is required.

The caliper type brake included in the illustrative embodiment of this invention comprises a casing 200 which forms a pair of wheel cylinders 201, 202 containing a pair of complementally formed pistons 203, 204. The pistons 203, 204 are actuated by hydraulic fluid from the lines 10, 11 so as to apply pressure to disc 205 made of conventional brake lining material suitable for high unit pressures. It will be understood that the illustrative structure represents only one half of the brake actuator for a given wheel, and that this structure is symmetrically duplicated on the other side to complete the caliper type brake. That is, each wheel brake actuator includes four cylinders and pistons each of which is actuated by dual hydraulic lines.

Taking the top cylinder and piston 201, 203 shown in FIGURE 1 by way of example, it can be seen that a stepped structure is provided so that the hydraulic fluid from line 10 acts against an annular piston surface 203a, whereas the fluid from the second hydraulic line 11 acts against the surface on the rear end of the piston at 203b. In accordance with one aspect of this invention, a dual hydraulic seal is provided between the two surfaces 203a, 203b so that a leak in either one of the hydraulic lines 10 or 11 does not affect the pressure in the other line. More particularly, two resilient sealing rings 206, 207, oriented in opposite directions, are mounted in corresponding peripheral grooves 208, 209 formed in the rearward portion of the piston 203 between the two surfaces 203a, 203b. Consequently, regardless of whether a leak occurs in hydraulic line 10 or in line 11, one of the fluid seals 206 or 207 will be effective to prevent the leakage in one line from affecting the pressure in the other line. Moreover, since the dual hydraulic system is carried through to each of the four cylinders at each wheel, the braking pressure will still be applied evenly and symmetrically to the brake discs even in the event of a complete failure in one of the hydraulic lines.

In the particular embodiment illustrated in FIGURE 1, a pair of conventional bleeder valves 220, 221 are mounted in appropriate sockets formed in the casing 200 for bleeding the dual hydraulic system. According to one aspect of this invention, a single bleeder valve, illustrated in FIGURE 4, is provided for both hydraulic lines. Thus, the top part of the structure shown in FIGURE 4 is a conventional bleeder valve seated in an annular socket 222 threaded into the outer portion of a recess formed in the main casing 200. Between the inner end of the socket 222 and the end of the casing recess, a valve chamber 223 is formed for receiving a pair of balls 224 and 225 which serve to close the passageways 226 and 227 associated with the dual hydraulic lines. In order to hold the balls 224, 225 in place to close the passageways 226, 227, a flexible and resilient rubber grommet is positioned against the inner end of the socket 222 and bearing against the two balls 224, 225 for biasing the same to the closed position. When the bleeder valve is opened by turning the bleeder screw 222a, the hydraulic pressure within the two lines 228, 227 forces the two balls 224, 225 away from the ends of the passageways to permit the discharge of hydraulic fluid out through the bleeder valve. While the hydraulic fluid is being discharged, however, the combination of the rubber grommet 228 and the metal balls 224, 225 forms a pair of independent check valves which permit hydraulic fluid from either one of the lines from backing up into the other line.

When the bleeder screw 222a is opened, it permits simultaneous bleeding of both sections of the dual hydraulic system through the common chamber 223 so that any occluded air remaining in the system after the bleeding operation is of substantially the same percentage content in both sections of the system, thereby providing more uniform and equal pressures throughout the pressure gradients. It is well known that the lines and other elements of brake systems expand and contract with changes in the brake fluid pressure. By bleeding the separate sections simultaneously, the common bleeder valve provided by this invention also serves to maintain equalized pressures in both sections after the bleeder screw 222a is closed, since any further passage of air will affect the compressibility of the separate sections equally, including any deformation in the rubber sealing element 228 due to changes in the brake fluid pressure. It will be appreciated that it is quite impossible to bleed separate sections alike with two separate bleeders, which can result in unequal amounts of occluded air and thus different degrees of compressibility of the brake fluid in the separate sections of the system.

I claim as my invention:

1. In a power unit for a dual hydraulic brake system, the combination of a casing having a power wall, said wall being movable in the casing responsive to differential pressures across the wall, two pairs of master cylinders mounted on said casing with the master cylinders of each pair symmetrically disposed on opposite sides of the central axis of said wall and having plungers operatively connected for movement by said wall, a pair of independent fluid reservoirs each of which is operatively connected to one of said pairs of master cylinders through an independent hydraulic passageway so that the two pairs of master cylinders are hydraulically isolated from each other and passage means hydraulically interconnecting each pair of opposed master cylinders whereby upon a drop in pressure in one of said pairs of master cylinders due to a drop in pressure in one side of said dual system, hydraulic and mechanical balance is retained in the other of said pairs.

2. In a power unit for a dual hydraulic brake system, the combination of a housing including means for mounting two pairs of operatively associated master cylinders with the two master cylinders of each pair being symmetrically disposed on opposite sides of a longitudinal axis, a pair of independent fluid reservoirs each of which is operatively connected to one of said pairs of master cylinders through an independent hydraulic passageway so that the two pairs of master cylinders are hydraulically isolated from each other, one pair of opposed master cylinders being hydraulically interconnected with the output of the two cylinders connected to a first fluid pressure transmitting line to actuate said brakes, the other pair of opposed master cylinders being hydraulically interconnected with the output of the two cylinders connected to a second fluid pressure transmitting line to actuate said brakes, whereby upon a drop in pressure in one of said pairs of master cylinders due to a drop in pressure in one side of said dual system, hydraulic and mechanical balance is maintained in the other of said pairs, a movable pedal for actuating said master cylinders, a power booster in said housing providing power assist for said pedal, axially movable actuating means extending longitudinally and operably connected for movement responsive to movement of said pedal and said power wall, an output mechanism in said housing for transmitting force from movement of said actuating means and applying said force to operate said master cylinders thereby producing fluid pressure in said lines.

3. In a dual hydraulic brake system, the combination of two pairs of master cylinders with the master cylinders of each pair mounted symmetrically on opposite sides of a central longitudinal axis, a pair of independent fluid reservoirs each of which is operatively connected to one of said pairs of master cylinders through an independent hydraulic passageway so that the two pairs of master cylinders are hydraulically isolated from each other, actuating means extending along said longitudinal axis for actuating said master cylinders, and passage means hydraulically interconnecting the two master cylinders of each of said pairs whereby upon a drop in pressure in one of said pairs of master cylinders due to a drop in pressure in one side of said dual system, hydraulic and mechanical balance is maintained in the other of said pairs.

4. In a dual hydraulic brake system, the combination of a housing including means for mounting two pairs of operatively associated master cylinders with the two master cylinders of each pair being symmetrically disposed on opposite sides of a longitudinal axis, a pair of independent fluid reservoirs each of which is operatively connected to one of said pairs of master cylinders through an independent hydraulic passageway so that the two pairs of master cylinders are hydraulically isolated from each other, one pair of opposed master cylinders being hydraulically interconnected with the output of the two cylinders connected to a first fluid pressure transmitting line to actuate said brakes, the other pair of opposed master cylinders being hydraulically interconnected with the output of the two cylinders connected to a second fluid pressure transmitting line to actuate said brakes, whereby upon a drop in pressure in one of said pairs of master cylinders due to a drop in pressure in one side of said dual system, hydraulic and mechanical balance is maintained in the other of said pairs, a movable pedal for actuating said master cylinders, axially movable actuating means extending longitudinally and operably connected for movement responsive to movement of said pedal, an output mechanism in said housing for transmitting force from movement of said actuating means and applying said force to operate said master cylinders thereby producing fluid pressure in said lines.

5. In combination with a dual hydraulic brake system and a master cylinder device, of the type having at least two separate sections for hydraulic operation of brakes, each section having a piston, a replenishing reservoir, a compensation orifice and a closure therefor operative upon retraction of a corresponding piston in each of said sections to open the orifice: actuating means for said master cylinder device including a guide member and a reaction member cooperating with said guide member and having a parallel movement for receiving the reaction of the pistons; means including additional pistons for each of said sections arranged and constructed to substantially balance said first mentioned pistons hydraulically and mechanically by reacting against said reaction member whereby the pistons of each of said sections will transmit substantially all of the force applied to the reaction member even in the case of failure of the pressure in any of the said sections, when the plungers of the remaining section transmit all of the said force, and a pair of independent fluid reservoirs each of which is operatively connected to one of said sections through an independent hydraulic passageway so that the two sections are hydraulically isolated from each other.

6. A hydraulic brake system as defined in claim 5 in which said actuating means and all of said pistons substantially surround a center axis of said master cylinder device.

7. A hydraulic brake system as defined in claim 5 in which said actuating means and all of said pistons substantially surround a center axis of said master cylinder device, and including a return spring and retainer means arranged to return all of said pistons to an initial position.

8. A hydraulic brake system as defined in claim 5 which includes a return spring and retainer means for returning all of said pistons to an initial position and a reach rod for maintaining said initial position, said rod having a lost motion connection with the master cylinder device and a retainer means on said center axis to accurately define the off position of said closure for said compensation device.

9. In a power booster for a dual hydraulic brake system, a casing including a forward wall and a rearward wall, dual pairs of master cylinders mounted in the forward wall of said casing and having therein four parallel pistons with the two cylinders and pistons of each pair being symmetrically disposed on opposite sides of a central longitudinal axis, a pair of independent fluid reservoirs each of which is operatively connected to one of said pairs of master cylinders through an independent hydraulic passageway so that the two pairs of master cylinders are hydraulically isolated from each other, said master cylinders being connected to fluid pressure transmitting lines, a movable pedal for actuating said pistons, a movable power wall mounted within said casing between said rearward wall and the rear ends of said parallel pistons for providing power assist for said pedal, axially movable actuating means extending longitudinally in said casing along an axis between said pistons and operably connected for movement by said pedal and said power wall, mechanism in said casing for transmitting a force from movement of said actuating means to operate said pistons thereby producing fluid pressure in said lines, reaction means operably connected between said pedal and said actuating means for transmitting a portion of the reaction force presented by said pistons back to said pedal, said mechanism comprising an abutment element associated with said reaction means for receiving simultaneously the reaction force from all of said pistons whereby to maintain a mechanical balance from any pair of said plungers in case of failure of the force in the other pair of plungers in the event of a relative drop in pressure in one of said lines.

10. A power booster unit as defined in claim 9 in which said dual pairs of master cylinders are located within a tubular guide for supporting said power wall and the mechanism around said axis.

11. A power booster unit as defined in claim 9 wherein said tubular member comprises an atmospheric compartment leading to the interior of said power wall for providing access to said atmosphere for controlling the movable wall by said actuating means, and a pneumatic seal associated with the tubular member for separating the pressures in the forward wall of said housing from said compartment.

12. In a compact power booster unit having a separately removable master cylinder device for use in a hydraulic brake actuating system, the combination comprising a casing and power wall assembly responsive to differential pressures across the wall assembly, an actuating means extending longitudinally along an axis through the casing on one side of the wall and passing through the wall, said wall assembly including an annular supporting member located on the outer side of said wall assembly, said casing having a guide sleeve for guiding and slidably supporting said wall via said member, said member and said sleeve having an air-vacuum seal therebetween to seal off atmospheric pressure from the inside of the guide sleeve and annular member; said master cylinder device having means constructed and arranged to be mounted on the casing around said axis and in substantial alignment therewith, said device comprising at least one piston and cylinder fastened to the casing and arranged to extend into the casing within said guide sleeve to the extent of the sleeve embracing a major portion of the piston and cylinder elements of said master cylinder unit.

13. A booster mechanism as defined in claim 12 in which said master cylinder device comprises a multiplicity of cylinders and pistons, which are interconnected in hydraulic and mechanical balance substantially around said axis.

References Cited
UNITED STATES PATENTS

| | | |
|---|---|---|
| 1,173,703 | 2/1916 | Benkert _____ 137—454.4 |
| 1,708,153 | 4/1929 | Reckler. |
| 1,781,868 | 11/1930 | Bragg et al. |
| 2,021,463 | 11/1935 | Peters. |
| 2,124,363 | 7/1938 | Bertrand. |
| 2,611,387 | 9/1952 | Legerski _____ 137—270 |
| 3,033,324 | 581962 | Lepelletier. |
| 3,143,926 | 8/1964 | Stelzer. |
| 3,149,539 | 9/1964 | Prather. |

MARTIN P. SCHWADRON, *Primary Examiner.*

ROBERT R. BUNEVICH, *Assistant Examiner.*

U.S. Cl. X.R.

60—54.6; 92—168; 188—152